(12) United States Patent
Maple et al.

(10) Patent No.: US 10,360,113 B2
(45) Date of Patent: *Jul. 23, 2019

(54) TRANSACTION RECOVERY IN A TRANSACTION PROCESSING COMPUTER SYSTEM EMPLOYING MULTIPLE TRANSACTION MANAGERS

(71) Applicant: International Business Machines Corporation, Armonk, NY (US)

(72) Inventors: Simon J. Maple, Basingstoke (GB); Ian Robinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 14/887,229

(22) Filed: Oct. 19, 2015

(65) Prior Publication Data

US 2016/0062852 A1 Mar. 3, 2016

Related U.S. Application Data

(63) Continuation of application No. 12/897,123, filed on Oct. 4, 2010, now Pat. No. 9,165,025.

(30) Foreign Application Priority Data

Dec. 11, 2009 (EP) .................................. 09178951

(51) Int. Cl.
*G06F 7/00* (2006.01)
*G06F 11/14* (2006.01)
(Continued)

(52) U.S. Cl.
CPC .......... *G06F 11/1471* (2013.01); *G06F 9/466* (2013.01); *G06F 11/2028* (2013.01);
(Continued)

(58) Field of Classification Search
None
See application file for complete search history.

(56) References Cited

U.S. PATENT DOCUMENTS 5,923,833 A * 7/1999 Freund ................ G06F 11/1482
707/999.202
5,951,695 A * 9/1999 Kolovson ........... G06F 11/1451
714/11

(Continued)

OTHER PUBLICATIONS

Beaven et al., "IBM WebSphere Developer Technical Journal: Transactional High Availability and Deployment Considerations in WebSphere Application Server V6", Apr. 6, 2005, pp. 1-21. http://www.ibm.com/developerworks/websphere/techjournal/0504_beaven/0504_beaven.html.

(Continued)

*Primary Examiner* — Eliyah S. Harper
(74) *Attorney, Agent, or Firm* — Yee & Associates, P.C.; Richard Wilhelm

(57) ABSTRACT

A technique for transaction recovery by one transaction manager of another transaction manager's transactions in which each transaction manager is adapted to manage two phase commit transactional operations on transactional resources and to record commit or rollback decisions in a transaction recovery log. The recovery transaction manager detects apparent unavailability of the another transaction manager for transaction processing and initiates a transaction recovery process for the another transaction manager's transactions. This process also determines whether any of the transactions of the another transaction manager have all respective resources prepared to commit without there yet being a pending commit decision record in the another transaction manager's recovery log. If so, the recovery transaction manager writes a rollback record indicating an intention to roll back the identified transaction, in the (Continued)

another transaction manager's recovery log provided no commit decision record has been recorded.

20 Claims, 6 Drawing Sheets

(51) Int. Cl.
*G06F 16/23* (2019.01)
*G06F 11/20* (2006.01)
*G06F 9/46* (2006.01)
*G06F 16/25* (2019.01)

(52) U.S. Cl.
CPC ...... *G06F 11/2035* (2013.01); *G06F 11/2046* (2013.01); *G06F 16/2365* (2019.01); *G06F 16/2379* (2019.01); *G06F 16/256* (2019.01); *G06F 2201/84* (2013.01)

(56) References Cited

U.S. PATENT DOCUMENTS

| | | | |
|---|---|---|---|
| 6,006,229 A | 12/1999 | Schmidt et al. | |
| 6,065,018 A * | 5/2000 | Beier | G06F 11/1402 |
| | | | 707/610 |
| 6,226,651 B1 * | 5/2001 | Masuda | G06F 11/1471 |
| 6,233,587 B1 | 5/2001 | Tandon | |
| 6,374,243 B1 | 4/2002 | Kobayashi et al. | |
| 6,754,657 B2 * | 6/2004 | Lomet | G06F 16/2477 |
| 6,856,993 B1 * | 2/2005 | Verma | G06F 16/1865 |
| 7,089,564 B2 * | 8/2006 | Chen | G06F 9/526 |
| | | | 718/101 |
| 7,103,597 B2 | 9/2006 | McGoveran | |
| 7,257,690 B1 * | 8/2007 | Baird | G06F 11/1471 |
| | | | 707/999.202 |
| 7,584,222 B1 | 9/2009 | Georgieve | |
| 9,165,025 B2 | 10/2015 | Maple et al. | |
| 2003/0154423 A1 * | 8/2003 | Egolf | G06F 11/1474 |
| | | | 714/15 |
| 2003/0208500 A1 * | 11/2003 | Daynes | G06F 16/289 |
| 2005/0086664 A1 | 4/2005 | Sundaresan et al. | |
| 2005/0262007 A1 | 11/2005 | Barnes et al. | |
| 2006/0075277 A1 | 4/2006 | Johnson et al. | |
| 2007/0239736 A1 | 10/2007 | Groff et al. | |
| 2008/0250074 A1 * | 10/2008 | Parkinson | G06F 11/1474 |
| 2008/0250272 A1 | 10/2008 | Barnes et al. | |
| 2009/0217274 A1 * | 8/2009 | Corbin | G06F 9/466 |
| | | | 718/101 |
| 2009/0300405 A1 * | 12/2009 | Little | G06F 11/203 |
| | | | 714/3 |
| 2010/0010987 A1 * | 1/2010 | Smyth | G06F 16/9535 |
| | | | 707/E17.014 |
| 2010/0146008 A1 | 6/2010 | Jacobsen et al. | |
| 2010/0146033 A1 | 6/2010 | Kaczynski et al. | |
| 2010/0169284 A1 * | 7/2010 | Walter | G06F 11/1474 |
| | | | 707/682 |
| 2011/0145204 A1 | 6/2011 | Maple et al. | |

OTHER PUBLICATIONS

Office Action, dated Feb. 16, 2012, regarding U.S. Appl. No. 12/897,123, 12 pages.
Final Office Action, dated Aug. 1, 2012, regarding U.S. Appl. No. 12/897,123, 26 pages.
Office Action, dated Mar. 14, 2013, regarding U.S. Appl. No. 12/897,123, 11 pages.
Office Action, dated Aug. 12, 2013, regarding U.S. Appl. No. 12/897,123, 10 pages.
Office Action, dated Dec. 27, 2013, regarding U.S. Appl. No. 12/897,123, 10 pages.
Office Action, dated Apr. 23, 2014, regarding U.S. Appl. No. 12/897,123, 10 pages.
Office Action, dated Aug. 29, 2014, regarding U.S. Appl. No. 12/897,123, 11 pages.
Office Action, dated Feb. 24, 2015, regarding U.S. Appl. No. 12/897,123, 13 pages.
Notice of Allowance, dated Jun. 5, 2015, regarding U.S. Appl. No. 12/897,123, 12 pages.

* cited by examiner

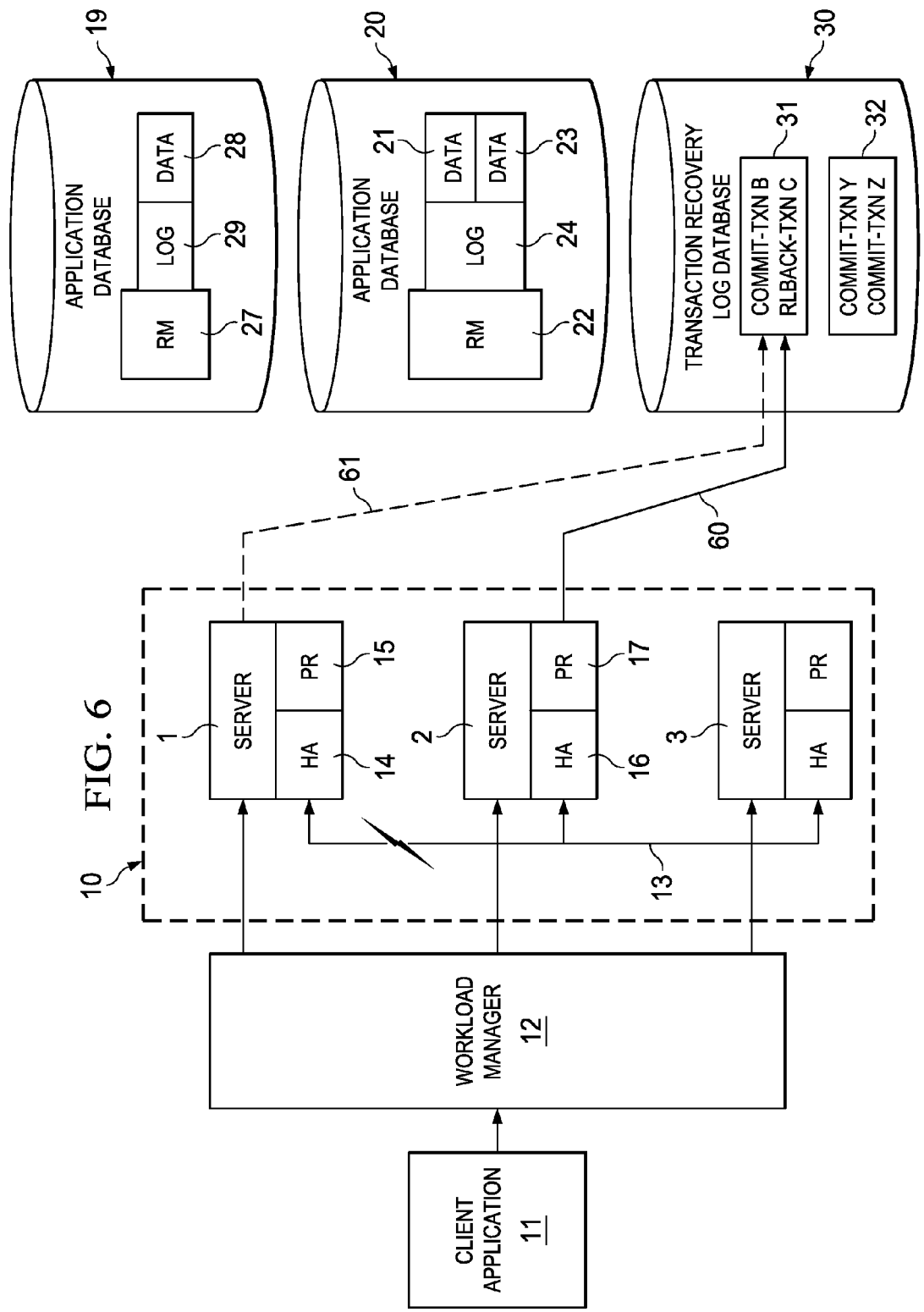

TRANSACTION RECOVERY IN A TRANSACTION PROCESSING COMPUTER SYSTEM EMPLOYING MULTIPLE TRANSACTION MANAGERS

CROSS-REFERENCE TO RELATED APPLICATION(S)

This application is a continuation of and claims the benefit of priority to U.S. patent application Ser. No. 12/897,123, filed on Oct. 4, 2010, which claims priority to European Patent Application No. 09178951.1, filed on Dec. 11, 2009. The contents of both aforementioned applications are incorporated herein by reference.

BACKGROUND

1. Field

The present invention relates to a method, transaction manager, transaction processing computer system and computer program for transaction recovery in a multiple transaction manager system and in particular to the prevention of conflict between a recovery transaction manager and another apparently unavailable transaction manager.

2. Description of the Related Art

Transaction processing computer systems in which operations are carried out on resources, for example customer databases, are extremely well known. Such operations are generally implemented using a so-called two phase commit process in which the resources involved are polled by a transaction coordinator (or manager) to see if they are ready to commit to make the changes defined by the transaction. If they are ready, they enter a "prepared" phase and reply in the affirmative. If all resources are prepared, the coordinator issues "commit" instructions, but until the changes to the resources have been made and they have confirmed this to the coordinator, the transaction remains "in-doubt". In the event that there is a failure in the transaction coordinator while the transaction is in-doubt, the coordinator enters a recovery phase, upon restart, in which it can either complete in-doubt transactions for which it has actually issued a commit instruction or else it can roll back the transaction, meaning that instructions are issued to restore the system to the state it was in immediately prior to the transaction starting. Thus, the transactions may be said to be "atomic" in that changes to resources are either all committed or all rolled back.

In order to be able to complete prepared transactions following a failure, both coordinators and resources log their status during the two phase commit process in transaction recovery logs. These logs are stored persistently and can be referred to as necessary to complete outstanding in-doubt transactions. This activity is referred to as transaction recovery processing and is carried out separately from mainstream forward processing of transactions.

Another aspect of modern transaction processing systems is the need for high availability (HA) under heavy transactional workloads such as may be found in a banking or reservation system. A well known approach to support high availability is to distribute transactions between multiple servers in parallel so as to balance the workload. The servers may be separate computers or separate server instances of a multi-processing computer. Each server acts as a transaction coordinator for transactions routed to it and maintains its own transaction log.

Such a group of servers may be configured as a peer group known as a cluster in which each server is aware of the other servers in the cluster. Should one of the servers fail in the course of a transaction, a high availability system needs to provide a means of rapid recovery in addition to normal attempts to restart the failed server. One such technique is that of peer recovery processing, whereby one of the peer group can be configured to take over and complete the transaction by accessing the failed server's transaction log. To achieve this, transaction recovery logs need to provide shared access to transaction coordinator peers.

For example, if servers A and B perform independent transactional work and server A fails, then in an HA configuration server B should continue its own independent work but may also act as a recovery server for server A's transactions if so directed by a high-availability management component of the server. If the recovery log medium is a logical file (which may consist of a number of physical files) on a shared file system, then server B's HA configuration must allow it to access server A's recovery log.

A well-known complication with this scenario is that peer recovery can be triggered as the result of the occurrence of a partial network partition in which both server A and server B can access the shared file system but can no longer see one another on the network. The high availability management software, when it considers a server to be unavailable, may direct a server peer to recover but often has no real way of knowing that the "failed" server really has failed. Problems will occur if a peer-recovery server takes over a "failed" server's log when the "failed" server is actually still healthy and writing to it. Various hardware techniques occur to prevent this, including redundant networks and "quorum" facilities that switch off the power to any servers that appear to have failed. These techniques rely on instantaneous partition detection and are not safe. For the case of a recovery log hosted in a shared file system, the use of an exclusive lease-based file lock provides a simple solution to this problem, with the exclusive lock determining ownership of the file. Modern file servers, such as those offering the Internet Engineering Task Force's open NFSv4 protocol for distributed file sharing, provide such lease-based locks.

One product that supports such a file system is the IBM WebSphere Application Server Version 6 ("IBM" and "WebSphere" are trademarks of International Business Machines Corporation). A discussion of the problem and its solution by means of exclusive lease-based locking may be found in a paper entitled "Transactional high availability and deployment in WebSphere Application Server V6" by J. Beaven and I. Robinson published on line in the IBM WebSphere Developer Technical Journal on 6 Apr. 2005.

In general transaction processing, it is known that transaction recovery logs may be stored in a database and that such a database may also hold persistent data on which an application operates within the scope of a transaction. Suitable databases include IBM's DB2 on z/OS or DB2 HADR and Oracle RAC ("IBM", "DB2" and "z/OS" are trademarks of International Business Machines Corporation; "Oracle" is a trademark of Oracle Corporation). One such system is shown in US Published Patent Application 2008/0250272 A1 to T. E. Barnes et al. entitled "Logging Last Resource System", assigned to BEA Systems Incorporated.

It might therefore be contemplated that, instead of investing in the separate infrastructure and management of a highly available file system, it would be possible to base high-availability solutions around such databases. Such an arrangement cannot, however, solve the partial network partition problem in a high availability system employing peer recovery in the same manner as with a network file system since, while the database can serialize access to a table representing a transaction recovery log, it does not provide a reliable lease-based mechanism for revoking that lock in the event that an application server really has failed. A database may notice that a remote connection is no longer available if a remote process has failed, but may receive no timely indication from the communications stack in the case of server node outage.

If a recovery peer server is assigned to complete in-doubt work while a "failed" server is actually still healthy, unatomic outcomes may result, as in the following scenario: Server A is part of a partitioned network. An HA manager believes it to have failed although it has not. Server A is processing a transaction and prepares resources XA1 and XA2, for example. It makes a commit decision which requires a COMMIT record to be written to the log.

Some time previously, server B has been assigned as a peer recovery coordinator for server A and contacts all configured resource managers to obtain a list of their in-doubt transactions. It determines there are resources XA1 and XA2 for which it has no COMMIT record (because Server A hasn't written it to the log yet) and so directs the appropriate resource managers to rollback XA1 and XA2.

Server A then forces its COMMIT record by writing it to the transaction recovery log and then directing both XA1 and XA2 to commit.

This creates a race condition since if server A gets to XA1 first and manages to commit while server B gets to XA2 first and effects a rollback, the outcome will be mixed and thus unatomic.

SUMMARY

Accordingly, the present invention provides a method of transaction recovery by one transaction manager of transactions associated with another transaction manager in a transaction processing computer system in which both said transaction manager and said another transaction manager are adapted to manage two phase commit transactional operations on transactional resources and to record commit or rollback decisions in a respective transaction recovery log, each of the transaction resources being managed by a resource manager that is operable to record a prepared status of a given resource to commit changes defined by a transaction, the method comprising steps of: said one transaction manager detecting apparent unavailability of said another transaction manager for transaction processing; in response to such detection, said one transaction manager initiating a transaction recovery process for said transactions associated with said another transaction manager, said process including the further steps of determining whether any of the transactions of said another transaction manager have all respective resources prepared to commit without there yet being a pending commit decision record in a transaction recovery log of said another transaction manager and, if such a transaction is identified, writing a rollback record indicating an intention to roll back the identified transaction in said transaction recovery log of said another transaction manager if no commit decision record has been recorded subsequent to said determining step.

According to a second aspect, the invention also provides a computer program for transaction recovery in a transaction processing computer system, the program comprising instructions which, when executed in the computer system, causes said system to carry out the steps of the above method.

According to third aspect, the invention also provides a transaction manager capable of recovery of transactions associated with another transaction manager in a transaction processing computer system in which said transaction manager and said another transaction manager are adapted to manage two phase commit transactional operations on external transactional resources and to record commit or rollback decisions in a transaction recovery log, each of the transaction resources being managed by a resource manager effective to record a prepared status of the resource to commit changes defined by a transaction; said recovery transaction manager comprising program code that is operable when executed to perform steps of: detecting apparent unavailability of said another transaction manager for transaction processing; determining, responsive to said detecting, whether any of the transactions of said another transaction manager have all respective resources prepared to commit without there yet being a pending commit decision record in a transaction recovery log of said another transaction manager and writing, responsive to said determining, a rollback record indicating an intention to roll back the identified transaction in said transaction recovery log of said another transaction manager if no commit decision record has been recorded subsequent to said determination.

Thus, by flagging the intention to roll back an apparently in-doubt transaction by means of an extra record written to the transaction log, conflict between a peer recovery server and a server which it believes incorrectly to have failed, because of a network partitioning situation, is avoided without the need for a file sharing system employing exclusive lease-based file locking.

This has the benefit that the extra processing occurs during recovery processing, which is not performance critical. There is no additional processing required on the mainline processing path and all the extra cost is to recovery processing.

The invention may also be seen as providing a transaction processing computer system wherein if said another transaction manager is available for transaction processing, said another transaction manager is allowed to write a commit decision record provided there is no rollback record for the same transaction already in said transaction recovery log of said another transaction manager.

It will be realized that the number of transaction managers (servers) may be any number greater than or equal to two and may be peers in a cluster of transaction managers. Preferably, in this case, program code is provided for designating one of said transaction manager and another transaction manager as the recovery transaction manager in response to detection of apparent unavailability of the other of the transaction manager and the another transaction manager. If the number is two, then whichever server detects the apparent unavailability of the other is automatically the designated peer recovery server. If the number is greater than two, then the peer recovery server may be designated statically in advance by an administrator or dynamically according to an appropriate predetermined algorithm.

It is preferred that the detection of unavailability step is adapted to monitor for loss of heartbeat signals transmitted by said another transaction managers.

Although the invention is of particular utility where the stored transaction recovery logs are held in a database, there is no reason why it could not be used as an alternative to exclusive lease-based file locking in a file sharing system.

It is preferred that where the stored transaction recovery logs are tables in a database, individual transaction records being identified by keys, the writing of said commit and rollback decision records is prevented if a record using the same key already exists.

Preferably, if the other transaction manager is in fact available, it is shut down if it is not allowed to write the commit decision record to its transaction recovery log for the identified transaction because there is already a rollback record for the same transaction in its recovery log.

Similarly, if its attempt to write the rollback record for said identified transaction is rejected because there is already a commit record for said transaction in said transaction recovery log of said another transaction manager, the recovery transaction manager attempts to commit the prepared resource changes defined by said transaction. This situation may arise where the other transaction manager has completed writing of a commit record and then goes down before the corresponding resource changes have been made.

BRIEF DESCRIPTION OF THE SEVERAL VIEWS OF THE DRAWINGS

The invention will now be described by way of example only with reference to a preferred embodiment thereof as illustrated in the accompanying drawings in which:

FIG. 6 shows the system of FIG. 2 after a roll back action by the recovery server is allowed.

DETAILED DESCRIPTION

Figure 1:
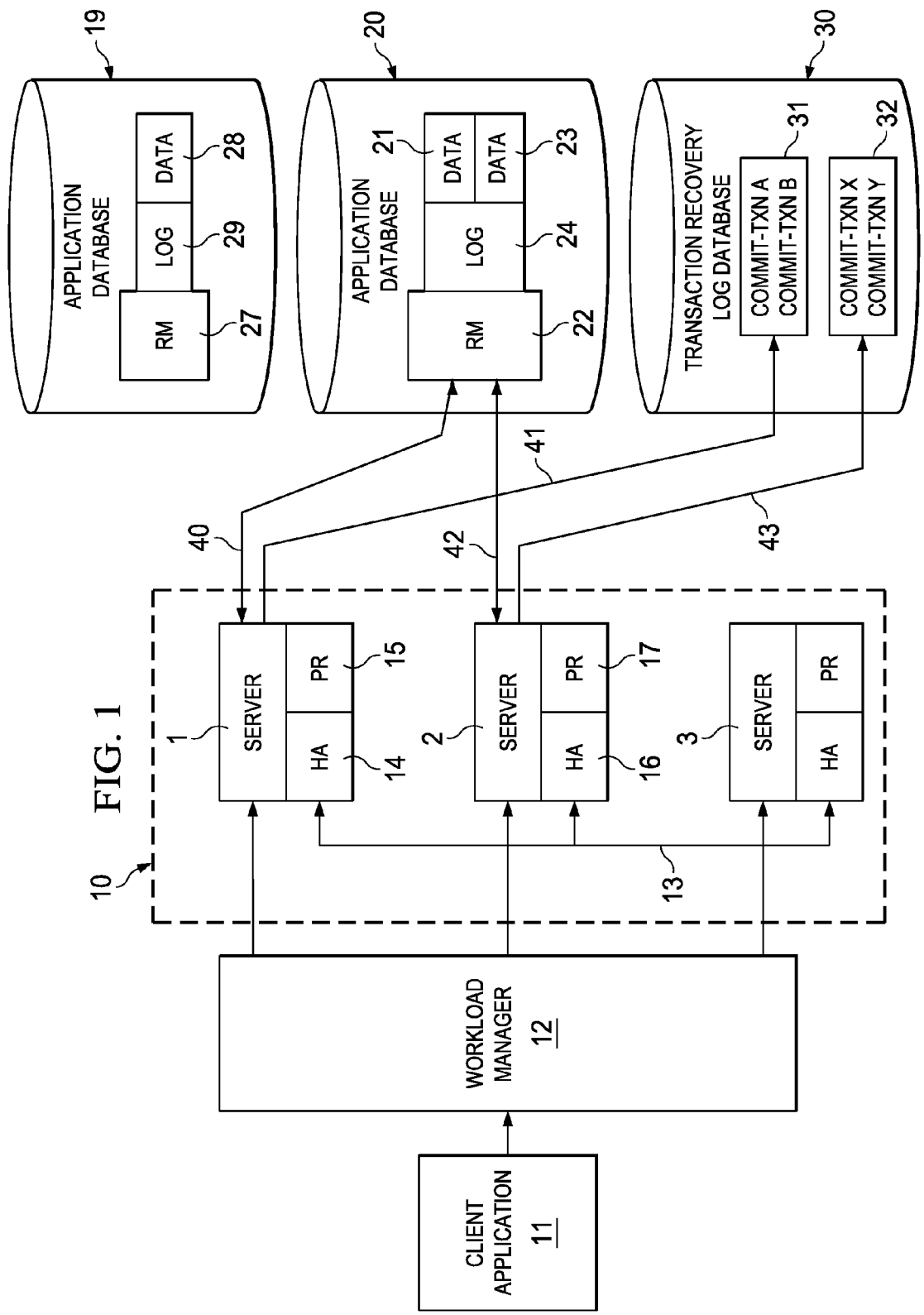
FIG. 1 is a schematic block diagram of a transaction processing system employing a cluster of peer servers capable of transaction recovery according to the present invention in a first state.

FIG. 1 shows a transaction processing system employing a cluster 10 of application servers labeled 1, 2 and 3 which act as transaction coordinators (managers). Transactional work is fed to the cluster from a client application 11 and distributed between the servers by a workload manager 12 so as to achieve a balanced workload. In a cluster, the various servers are aware of each other by monitoring heartbeat signals pinging between them on path 13.

Customer data 21, 23, 28, to which transactional changes will be applied, is stored in relational databases 19 and 20. The databases 19 and 20 also provide resource manager functions 22 and 27 for managing the data and for communicating with the transaction coordinators. Resource manager logs 24 and 29 record the state of resource managers during transaction processing, in particular whether they are prepared to commit the changes called for by the transaction being processed.

The resource manager's log contents that are relevant to particular transactions are requested by the transaction coordinator and, if all resources are prepared, the coordinator records a "Commit" record in a separate transaction recovery log in a further database 30. Once the Commit record is recorded in the recovery log, the transaction coordinator, in normal operation, issues a "Commit" instruction to the involved resource managers in the application databases, causing them to commit the changes for which they have indicated they are prepared. This is a conventional two phase commit operation.

In the event of a failure to complete the transaction, various recovery procedures are available, depending on the nature of the failure. For example, the coordinator may be in a position to retry the transaction or, in the event the coordinator has gone down, it will attempt to restart and then examine its recovery log with a view to either completing in-doubt prepared transactions, or else rolling them back so that the resources involved are restored to their state prior to the transaction.

Such retries or restarts cause delays, and in a cluster arrangement another server can be designated to perform recovery by examining the failed server's log and taking over the recovery process. This is known as "peer recovery". The peer recovery server continues to process its own transactions at the same time as it attempts to recover those of the failed server, so such systems offer the benefit of high availability.

In FIG. 1, it will be seen that server 1 has a High Availability (HA) manager 14 and associated peer recovery software 15. Similarly server 2 has a HA manager 16 and peer recovery software 17. Server 3 also has the same components.

For the present discussion, it is assumed that server 1 is going to carry out transactions A, B and C on the sets of data 21 and 28 controlled via resource managers 22 and 27 in application databases 19 and 20 and that server 2 is going to carry out transactions X, Y and Z on another set of data 23 also controlled by resource manager 22. Each server has its own transaction recovery log as a table in the recovery log database 30. Thus, server 1 has a recovery log 31 and server 2 has a recovery log 32. Each row of the log table holds a COMMIT record showing which particular transactions have been prepared and can therefore be implemented in the application database.

A typical transaction processing scenario will now be described in order to facilitate an understanding of the invention.

Server 1 initiates transaction A by performing work on data 21 in database 20. The original state of data 21 is also stored temporarily by the resource manager 22. Server 1 sends a "Prepare" flow to the database as indicated by line 40 and receives a "Prepared" response back if the changes have been made and the resource manager is able to commit them. Similarly, a transaction B is initiated and a "Prepared" response returned. The resource manager 22 retains the "Prepared" responses in an internal resource manager log 24.

Server 1 then performs transactional logging to its own recovery log' 31, as indicated by line 41 resulting in log records COMMIT-TXN A and COMMIT-TXN B. Similarly server 2 prepares and logs COMMIT-TXN X and COMMIT-TXN Y, as indicated by lines 42 and 43.

Figure 2:
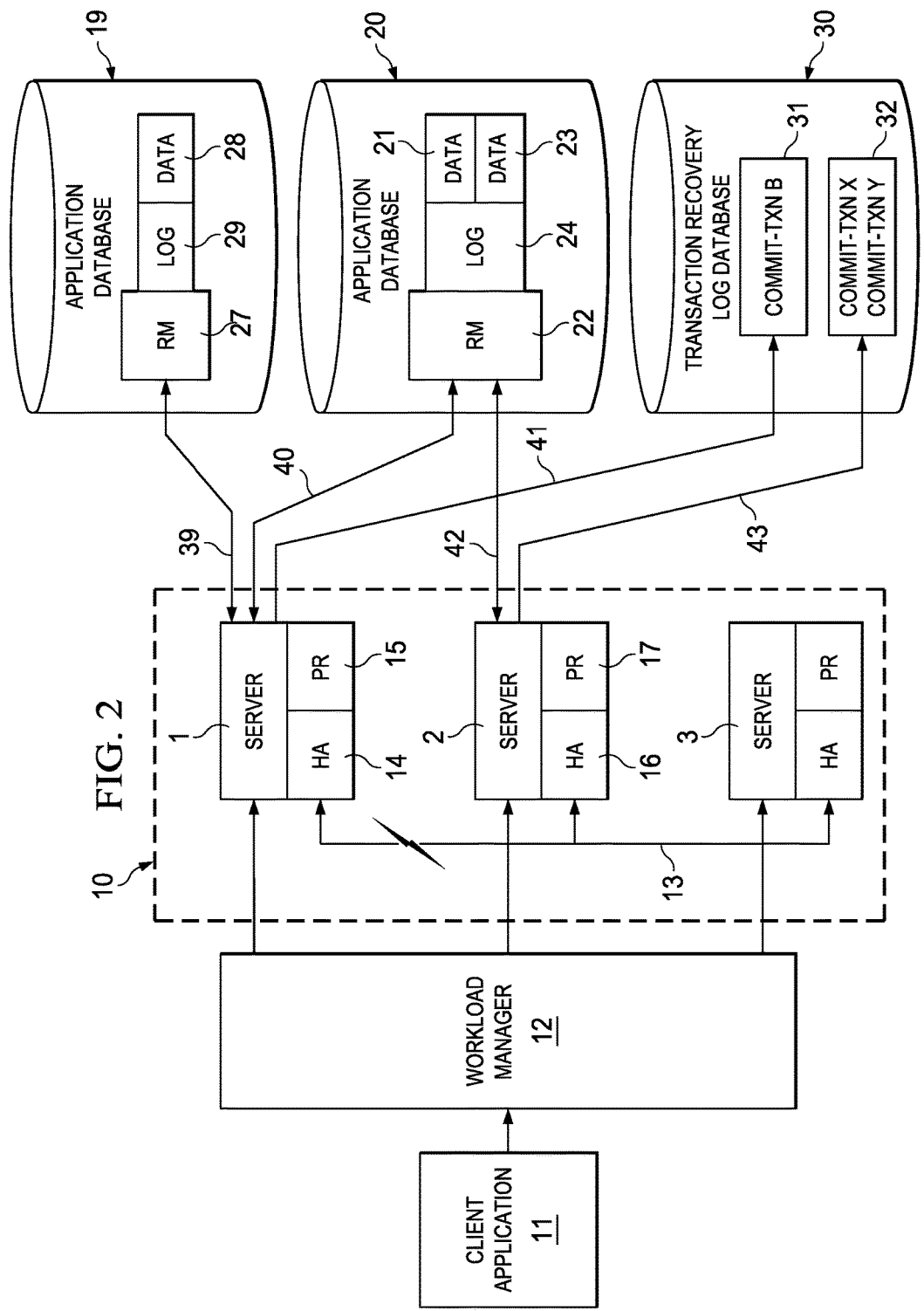
FIG. 2 shows the transaction processing system of FIG. 1 after a Network Partition arises so that one server is isolated from the others in the cluster.

As shown in FIG. 2, assume that a problem in the network prevents server 1 and 2 from seeing each other. This is referred to as "Network Partitioning" and is illustrated by the lightning flash through line 13. However, both servers are actually up and running so both continue to perform work on the application databases 19 and 20 and on the recovery logs database 30 in response to user requests from the client application. This is known as forward processing.

It is now assumed that server 1 has initiated a new transaction C to perform work on both data 21 in database 20 and on data 28 in database 19. As before, a Prepare request is flowed over line 40 to database 20 but a Prepare request is also flowed to database 19 over line 39. Assuming both resource managers 22 and 27 are ready to make the changes called for by transaction C, prepared responses are returned to server 1 over lines 39 and 40 indicating the readiness of the resources to commit. However, at this stage, server 1 has not logged the COMMIT status for transaction C in its recovery log 31. It has, however, removed the entry COMMIT-TXN A, having caused resource manager 22 to make the appropriate changes to data 21.

It is assumed that server 2 has also committed transaction X and removed the corresponding log record from recovery log 32. It has also logged a record COMMIT-TXN Z for a new transaction Z.

Figure 3:
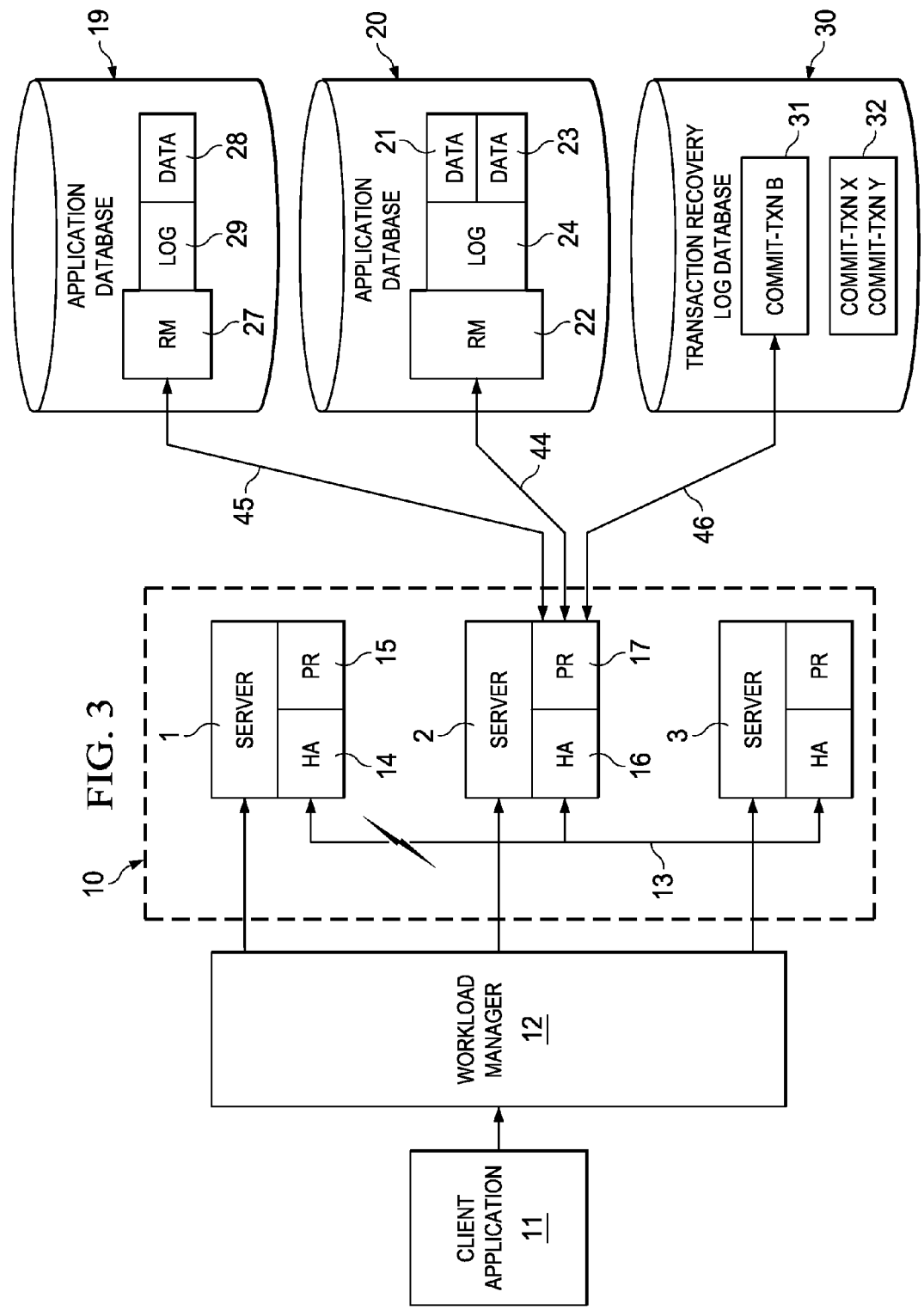
FIG. 3 show the commencement of recovery of the isolated server's transactions by another of the servers in the partitioned system of FIG. 2.

Referring now to FIG. 3, it is assumed that, as a result of the network partition, the HA manager 16 in server 2 has instructed it to perform peer recovery for server 1. This involves a recover flow to the application databases 19 and 20, indicated by lines 44 and 45, requesting all transaction IDs owned by server 1 which are currently in the Prepared state in the resource manager logs 24 and 29. In the current example, these are the IDs of transactions B and C. A second flow to read the Committed transaction recovery log entries for server 1 is indicated by line 46. This returns just the ID of transaction B.

There is now a potential conflict as server 1 is ready to log a Commit record, COMMIT-TXN C, in its recovery log 31 to force the commitment of Transaction C. Server 2, meanwhile, seeing no COMMIT-TXN C record in server 1's recovery log 31, wants to roll back the changes in the application database caused by Transaction C as it believes the transaction to be in-doubt.

Because of the unpredictability of the order in which the two servers will attempt to initiate their respective actions, effectively, a race condition is created. This would not be a problem for a transaction accessing a single resource manager, as neither the Commit nor Rollback outcomes would affect the integrity of the transaction data. However, in the present example, Transaction C involves two resource managers 22 and 27. It is thus possible that the data controlled by one might be rolled back while that controlled by the other is committed. This means that the transaction outcome is unatomic.

Figure 4:
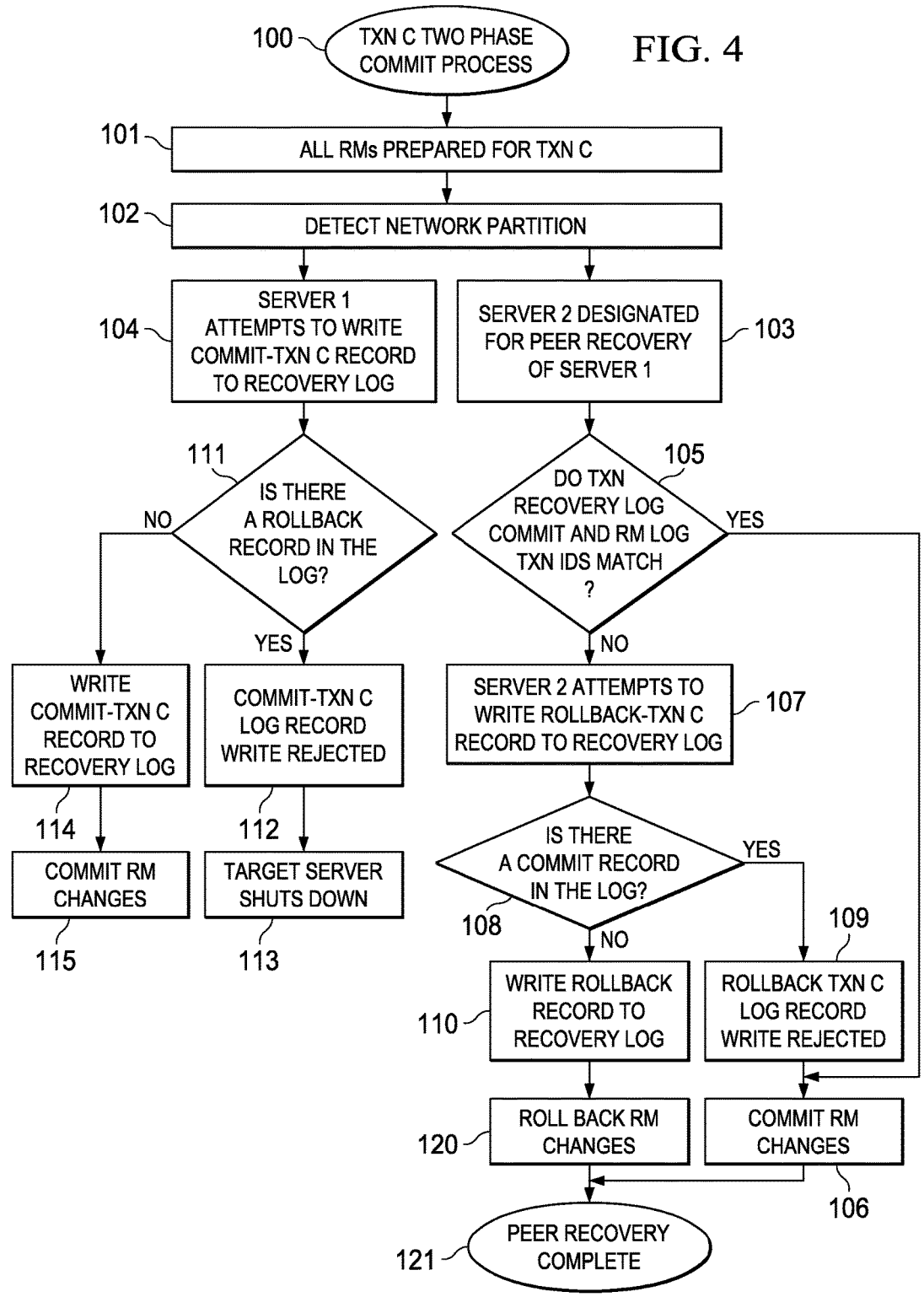
FIG. 4 is a flow diagram of a transaction recovery process according to the invention in the partitioned system of FIG. 2.

To solve this problem, the invention in accordance with a preferred embodiment proposes the use of a new type of transaction recovery log record, ROLLBACK, indicating the intention to roll back a transaction. This can ensure that whichever server is the later will terminate its action without causing error in the transaction processing. This is explained with reference to the flow diagram of FIG. 4 in which the steps of a method according to a preferred embodiment are set out. In FIG. 4, a two phase commit process, 100, for Transaction C is assumed to be under way and both involved resource managers, 22 and 27, are assumed to be prepared to commit, at step 101. At this point, a network partition event 102, such as that shown in FIG. 2, is detected and results in the HA manager component of one of the servers, server 2 for example, being designated in step 103, on the right hand side of FIG. 4, to perform peer recovery of server 1's transactions. In parallel with this, as shown on the left hand side of FIG. 4, server 1 attempts to write a COMMIT-TXN C record to recovery log 31 in step 104.

Dealing first with the peer recovery process, server 2 requests the ID's of prepared transactions from the resource manager logs 24 and 29 in the application servers 19 and 20 and also requests server 1's transaction recovery log's COMMIT transaction ID's from table 31. The two sets of transaction ID's are compared in step 105 to see if they match.

If any of the two inputs are determined to match in step 105, then the corresponding transaction must have already been committed by the writing of a COMMIT-TXN record in table 31 and the commit decision will be flowed back, in step 106, to the resource managers involved to complete the transaction (if the changes have already been made by server 1, in the event it has not really failed, the further instruction to the resource managers to commit the changes will be ignored).

If, as in the present example of Transaction C, the two inputs to step 105 do not match, server 2 attempts to write a ROLLBACK-TXN C record to recovery log 31 in step 107. At this point, both servers are attempting to write different records representing different outcomes for Transaction C to log 31 and it is not predictable which will be successful. Before the ROLLBACK record can be written, it is therefore determined, in step 108, if a COMMIT record for the same transaction is already present in log 31. If it is, writing of the ROLLBACK record is rejected in step 109. The attempt by server 2 to write the ROLLBACK record will fail as a result of a duplicate key exception since, when server 2 attempts to access the recovery log table row for the transaction by supplying the transaction ID as a key, it finds there is already an entry.

In order to cover the additional possibility that Server 1 may have written a COMMIT record for Transaction C and then genuinely failed, the peer recovery process continues after rejection of the attempt in step 109 to write the ROLLBACK record by attempting to complete the Commit process instead. This is illustrated in FIG. 4 by the line from step 109 to step 106, which commits the Resource Manager changes. This attempt will be redundant if Server 1 did not fail but was simply rendered inaccessible to Server 2 by a network partition event as originally envisaged. However, no harm will result and including this feature is necessary to ensure peer recovery where the need is the result of a real failure.

Returning to the case where Server 1 has not actually failed, even if the COMMIT-TXN record has already been written and removed by the coordinator, so that the ROLLBACK record is written, the recovery rollback process will not cause any harm as the previous state of the data stored by the resource managers while the transaction was in-doubt will no longer exist. This may cause exceptions but will not affect the integrity of the current data.

If, in step 108 it is determined that there is no COMMIT record for the transaction of interest in log 31, then a ROLLBACK record is written to log 31 in step 110, after which the Resource Manager changes, prepared in step 101, are rolled back in step 120. The outcome of either step 120 or step 106 is that the peer recovery process is complete, as indicated at step 121.

Returning to a consideration of server 1's attempt to write a COMMIT-TXN C record to log 31 in step 104, it must first supply the transaction ID as a key to determine, in step 111, if a ROLLBACK record already exists. If the ROLLBACK record has been written (by server 2), the database returns a duplicate key exception and server 1 realizes another server controls its log. Accordingly, the attempt to write the COMMIT record is rejected in step 112 and server 1 shuts itself down, in step 113, after which the rollback process controlled by server 2 can proceed.

If there is no ROLLBACK record having the same ID in log 31 in step 111, then the COMMIT-TXN C record can be written, as shown in step 114, and the changes flowed back to the resource managers 22 and 27 in step 115.

Figure 5:
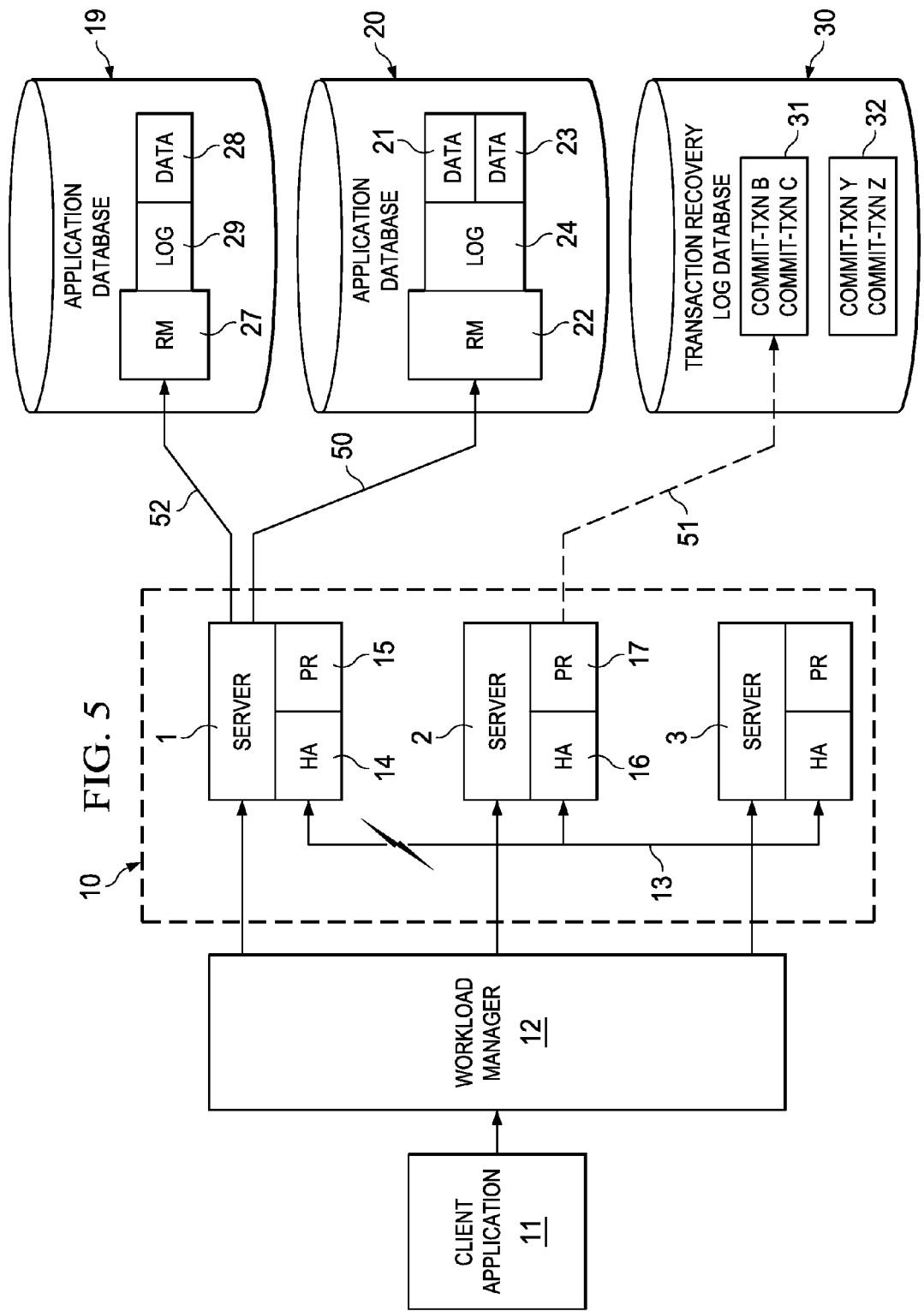
FIG. 5 shows the system of FIG. 2 after a Commit action by the isolated server is allowed.

The successful commit outcome of transaction C, corresponding to steps 114 and 115, is illustrated in FIG. 5. Lines 50 and 52 represent the flow back of the commit to the resource managers 22 and 27 to cause them to commit the changes to data 21 and 28 required by the transaction. A subsequent attempt, represented by dashed line 51, to roll back transaction C by peer recovery server 2 writing a ROLLBACK-TXN C record to recovery log 32 fails because there is already a COMMIT-TXN C record with the same transaction ID. This corresponds to steps 107 to 109, in FIG. 4.

The successful Rollback outcome of step 110 is illustrated by line 60 in FIG. 6 in which the ROLLBACK-TXN C record has been written into recovery log 31. The attempt by server 1 to write a COMMIT-TXN C record into the log 31 fails, as shown by the dashed line 61 corresponding to steps 111 to 113 of FIG. 4, because there is already a record in the log with the same transaction ID.

Although, in the above described example, it is assumed that Server 2 is the first to attempt to peer recover for Server 1, it makes no difference which of the two servers attempts peer recovery first or if both attempt peer recovery at the same time. As long as the recovery process is managed as described, a conflict between Rollback and Commit processes occurring on different servers in respect of the same transaction is avoided.

What is claimed is:

1. A method of transaction recovery by one transaction manager of transactions associated with another transaction manager in a transaction processing computer system in which both said transaction manager and said another transaction manager are adapted to manage two phase commit transactional operations on transactional resources and to record commit or rollback decisions in a respective transaction recovery log, each of the transaction resources being managed by a resource manager that is operable to record a prepared status of a given resource to commit changes defined by a transaction, the method comprising steps of:

said one transaction manager detecting apparent unavailability of said another transaction manager for transaction processing;

in response to such detection, said one transaction manager initiating a transaction recovery process for said transactions associated with said another transaction manager, said transaction recovery process including steps of:

determining whether any of the transactions of said another transaction manager have all respective resources prepared to commit without there yet being a pending commit decision record in a transaction recovery log of said another transaction manager and, if such a transaction is identified, writing a rollback record indicating an intention to roll back the identified transaction in said transaction recovery log of said another transaction manager if no commit decision record has been recorded subsequent to said determining step.

2. The method as claimed in claim 1, wherein if said another transaction manager is available for transaction processing, said another transaction manager is allowed to write a commit decision record in said transaction recovery log of said another transaction manager provided there is no rollback record for the same transaction already in said transaction recovery log of said another transaction manager.

3. The method as claimed in claim 1 in which said detection step comprises monitoring for loss of heartbeat signals transmitted by said another transaction manager.

4. The method as claimed in claim 2 in which the respective transaction recovery logs are tables in a database with individual transaction records being identified by keys, and further comprising a step of preventing writing of said commit and rollback decision records if a record using a same key already exists.

5. The method as claimed in claim 2 further comprising a step of shutting down said another transaction manager if said another transaction manager is not allowed to write the commit decision record to its transaction recovery log for the identified transaction.

6. The method as claimed in claim 2 further comprising a step of causing said one transaction manager, in the event that its attempt to write the rollback record for said identified transaction is rejected because there is already a commit record for said transaction in said transaction recovery log for said another transaction manager, to attempt to commit prepared resource changes defined by said transaction.

7. A non-transitory computer usable medium comprising a computer program stored thereon, where the computer program is operable for transaction recovery in a transaction processing computer system, the computer program comprising instructions which, when executed in the computer system, causes said computer system to carry out the steps of the method as claimed in claim 1.

8. A data processing system comprising a data processor and a transaction manager configured to recover transactions associated with another transaction manager in a transaction processing computer system in which said transaction manager and said another transaction manager are adapted to manage two phase commit transactional operations on external transactional resources and to record commit or rollback decisions in a transaction recovery log, each of the transaction resources being managed by a resource manager effective to record a prepared status of the resource to commit changes defined by a transaction; said transaction manager comprising program code that is stored on a non-transitory computer-usable storage device and is operable when executed by the data processor to perform steps of:

detecting apparent unavailability of said another transaction manager for transaction processing;

determining, responsive to said detecting, whether any of the transactions of said another transaction manager have all respective resources prepared to commit without there yet being a pending commit decision record in a transaction recovery log of said another transaction manager and writing, responsive to said determining, a rollback record indicating an intention to roll back the identified transaction in said transaction recovery log of said another transaction manager if no commit decision record has been recorded subsequent to said determination.

9. The data processing system as claimed in claim 8, wherein if said another transaction manager is available for transaction processing, said another transaction manager is allowed to write a commit decision record in said transaction recovery log of said another transaction manager provided there is no rollback record for the same transaction already in said transaction recovery log of said another transaction manager.

10. The data processing system as claimed in claim 8 in which said detecting unavailability is adapted to monitor for loss of heartbeat signals transmitted by said another transaction manager.

11. The data processing system as claimed in claim 9 further comprising a database in which the respective transaction recovery logs are tables in which individual transaction records are identified by keys, and further comprising program code for preventing writing of said commit and rollback decision records if a record using a same key already exists.

12. The data processing system as claimed in claim 9 further comprising program code for shutting down said another transaction manager if it is not allowed to write the commit decision record to the transaction log for the identified transaction.

13. The data processing system as claimed in claim 8 further comprising program code for causing said transaction manager, if its attempt to write the rollback record for said identified transaction is rejected because there is already a commit record for said transaction in said transaction recovery log of said another transaction manager, to attempt to commit the prepared resource changes defined by said transaction.

14. The data processing system as claimed in claim 9 in which said transaction manager and said another transaction manager are peers in a cluster of transaction managers, and further comprising program code for designating one of said transaction manager and another transaction manager as a recovery transaction manager in response to detection of apparent unavailability of the other of the transaction manager and the another transaction manager.

15. The method as claimed in claim 1, wherein the rollback record is written in said transaction recovery log of said another transaction manager by said one transaction manager.

16. The computer program of claim 7, wherein the rollback record is written in said transaction recovery log of said another transaction manager by said one transaction manager.

17. The data processing system as claimed in claim 8, wherein the rollback record is written in said transaction recovery log of said another transaction manager by said transaction manager.

18. The method as claimed in claim 1, wherein said another transaction manager is available for transaction processing notwithstanding the detected apparent unavailability of said another transaction manager by said one transaction manager.

19. The computer program of claim 7, wherein said another transaction manager is available for transaction processing notwithstanding the detected apparent unavailability of said another transaction manager by said one transaction manager.

20. The data processing system as claimed in claim 8, wherein said another transaction manager is available for transaction processing notwithstanding the detected apparent unavailability of said another transaction manager by said one transaction manager.

* * * * *